UNITED STATES PATENT OFFICE.

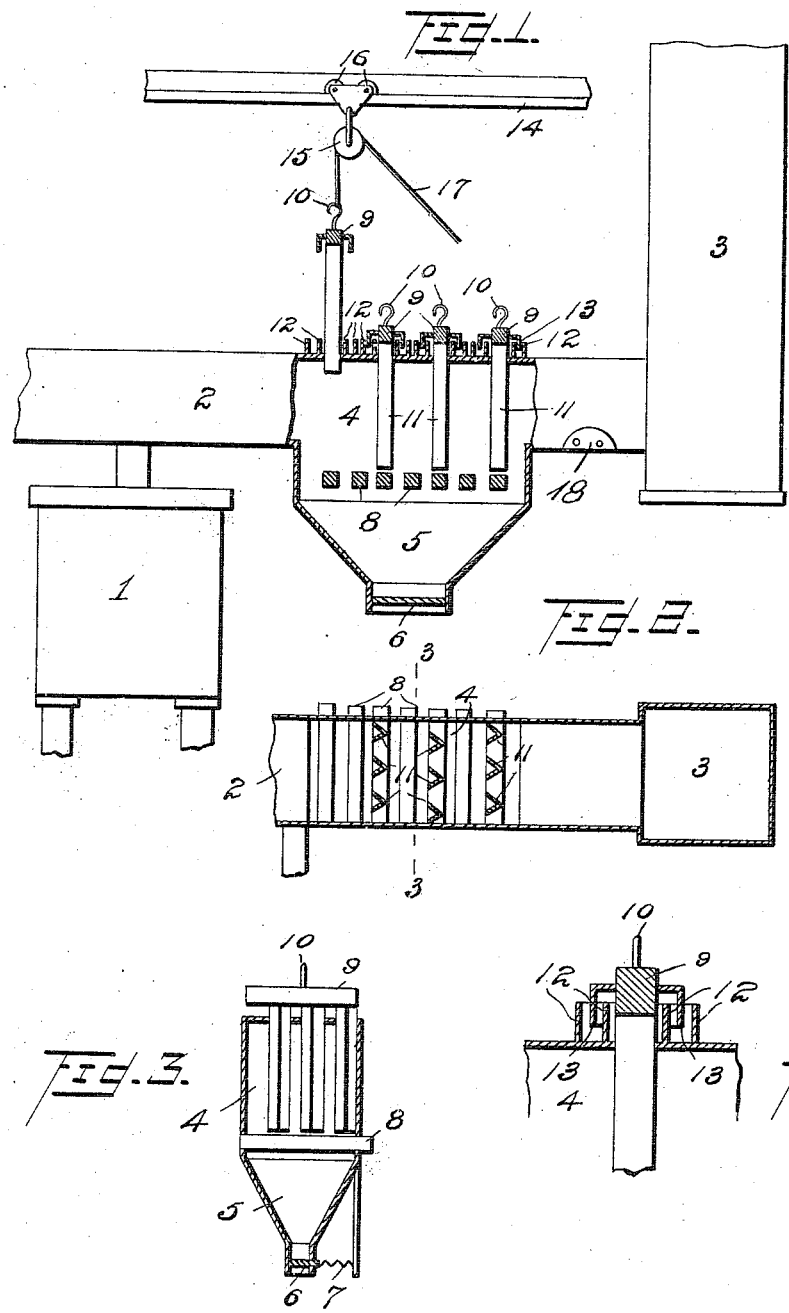

PATRICK J. DERRIG, OF NORTH WEYMOUTH, MASSACHUSETTS.

DUST-ARRESTER.

985,330.

Specification of Letters Patent. Patented Feb. 28, 1911.

Application filed May 19, 1910. Serial No. 562,217.

*To all whom it may concern:*

Be it known that I, PATRICK J. DERRIG, a citizen of the United States, residing at North Weymouth, in the county of Norfolk and State of Massachusetts, have invented certain new and useful Improvements in Dust-Arresters; and I do declare the following to be a full, clear, and exact description of the invention, such as will enable others skilled in the art to which it appertains to make and use the same.

This invention relates to dust arresters for use in flues between an ore roasting furnace and a Glover tower.

The principal object of the invention is to provide a dust arrester which may be cheaply installed in the gas flue between an ore roasting furnace and a Glover tower and which is so constructed as to collect all of the dust floating into the $SO_2$ gas.

Another object of the invention is to provide a dust arrester of this character which may be quickly cleaned without interfering with the operation of the system and which will prevent any dust passing to the tower to oxidize the nitrous compound therein thereby greatly reducing the percentage of nitrate of soda used in the tower, the sulfuric acid produced in the tower when this improved dust arrester is employed being as clear as acid made from brimstone.

With the foregoing and other objects in view the invention consists of certain novel features of construction, combination and arrangement of parts as will be more fully described and particularly pointed out in the appended claims.

In the accompanying drawings, Figure 1 represents a side elevation partly in longitudinal section of an apparatus embodying this invention. Fig. 2 is a horizontal section of a gas flue with this improved dust arrester applied thereto. Fig. 3 is a transverse section thereof taken on the line 3—3 of Fig. 2. Fig. 4 is a detail sectional view showing the connection of one of the dust arresting elements with the flue.

In the embodiment illustrated a fine ore roasting furnace 1, is shown having a flue 2 leading therefrom for conducting the $SO_2$ gas generated in the furnace to a Glover tower 3 in which sulfuric acid is produced. This flue 2 is provided between the furnace 1 and the tower 3 with an enlarged chamber 4 having a hopper like bottom 5, provided with a closure 6 which is preferably held in operative position by means of a coiled spring 7. A grate 8 is arranged at the upper end of the hopper 5 and is designed to receive the dust arrested in the chamber 4 and which are of any desired or suitable construction. The dust passes into the hopper 5 from which it may be removed through the opening in the bottom by any suitable means.

This improved dust arrester is mounted in the chamber 4, and preferably comprises a plurality of transversely arranged bars as 9, provided on their upper ends with hooks as 10, for a purpose to be described, and having a plurality of baffle plates, as 11, depending from them. These bars 9, are arranged transversely of the chamber 4, the top of said chamber being preferably covered with cast iron plates having upwardly projecting flanges as 12, between which flanges 13 carried by the plates 11, extend and which are luted therein, the lute so formed by the flanges above described, being preferably filled with fine dust or other suitable material which prevents the escape of gas around the plates.

Each of the bars 9 may be provided with any desired number of baffle plates, three being here shown which may be of any size and constructed of any shape in cross section, being here shown V-shaped. The baffle plates on one bar are arranged to alternate with those on the adjacent bar as is shown clearly in Fig. 2, to provide for the thorough sifting of the gas passing between these baffle plates which operate to eliminate all the dust from the gas passing through the flue.

A track 14 is preferably supported above the flue 2 by any suitable means and a pulley 15 is slidably mounted thereon preferably by means of pulley wheels as 16. A flexible hoisting element 17 operates over said pulley 15 and is provided at one end with any suitable means for engaging the hooks 10 of the bars 9 for raising the baffle plates above the flue when it is desired to clean them. When it is necessary to clean these plates each row or series connected with the respective bars 9 may be hoisted by means of the cable 17 as above described and this upward movement causes the plates 11 to scrape on the inside of the top of the flue which cleans the dust from the baffle plates and causes it to fall on to the grate bars 8 which may be opened when desired to permit the collected dust to fall into the hopper 5 from which it may be removed when necessary, the baffle plates being luted when lowered into operative position prevent the escape of the gas around them.

From the foregoing description it will be obvious that the $SO_2$ gas which is filled with dust when it leaves the furnace 1, is thoroughly sifted in its passage between the baffle plates 11 and enters the tower 3 in a perfectly clean condition.

The flue 2 adjacent the tower 3 is preferably provided with an inlet 18 through which nitrate of soda is charged into the pots for combining with the $SO_2$ gas to form sulfuric acid.

The baffle plates 11 which are preferably constructed of cast iron will last for years without renewing and thus render the device very cheap to manufacture.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention as defined in the appended claims.

What is claimed is:

1. A dust arrester comprising a casing having an inlet at one end and an outlet at the other, a plurality of series of baffle plates depending in said casing between said inlet and outlet, each series being composed of a plurality of longitudinally spaced plates connected rigidly, the plates of the respective series being arranged to alternate with each other, and longitudinally movable means for engaging and elevating the respective series.

2. A dust arrester comprising a casing having an inlet at one end and an outlet at the other end, a plurality of baffle plates depending into said casing, and arranged to alternate with each other, the upper ends of said baffle plates being luted, hooks arranged at the upper ends of said baffle plates and means for engaging said hooks for raising and lowering the baffle plates into operative and inoperative position.

In testimony whereof I have hereunto set my hand in presence of two subscribing witnesses.

PATRICK J. DERRIG.

Witnesses:
GEORGE W. NASH,
J. FRED. MILLER.

---

Copies of this patent may be obtained for five cents each, by addressing the "Commissioner of Patents, Washington, D. C."